United States Patent [19]

Romagnoli

[11] 4,060,168

[45] Nov. 29, 1977

[54] LABEL CONSTRUCTION

[75] Inventor: Robert A. Romagnoli, New York, N.Y.

[73] Assignee: Fleming-Potter Company, Inc., Peoria, Ill.

[21] Appl. No.: 627,593

[22] Filed: Oct. 31, 1975

[51] Int. Cl.² ........................ B65D 75/54; B65D 77/28; B32B 31/18

[52] U.S. Cl. .................................... 206/216; 206/390; 206/460; 206/820; 156/248; 40/2 B

[58] Field of Search ............... 206/526, 820, 390, 484, 206/460, 216; 40/2; 156/248, 253, 270, 277

[56] References Cited

U.S. PATENT DOCUMENTS

| | | | |
|---|---|---|---|
| 2,797,801 | 7/1957 | Bishop, Jr. | 206/820 |
| 3,250,385 | 5/1966 | Timms | 206/390 |
| 3,330,471 | 7/1967 | Timms | 206/390 |
| 3,370,365 | 2/1968 | Vosbikian | 206/484 |
| 3,501,365 | 3/1970 | Marshall | 206/390 |
| 3,524,271 | 8/1970 | Buske | 206/820 |
| 3,524,782 | 8/1970 | Buske | 206/820 |
| 3,630,346 | 12/1971 | Burnside | 206/484 |
| 3,715,856 | 2/1973 | Borel | 206/820 |

*Primary Examiner*—William T. Dixson, Jr.
*Attorney, Agent, or Firm*—Allegretti, Newitt, Witcoff & McAndrews

[57] ABSTRACT

A label assembly includes a strip or web of backing material with a series of printed labels arranged in serial order. The backing material includes a die cut portion opposed to the label which remains adhered to the label upon application of the label to a container. The cut portion may include printing and serves as a promotional item with improved pilfer resistance.

14 Claims, 7 Drawing Figures

LABEL CONSTRUCTION

BACKGROUND OF THE INVENTION

This invention relates to an improved label assembly and, more particularly, to a label assembly which includes an integral and separable promotional portion.

Pressure sensitive and gummed labels may be applied to a container during a packaging operation by mechanical apparatus or manual means. Labels are prepared for such use by first providing a backing strip. A layer of label material is then removably adhered to the backing strip generally uniformly over the entire surface of the backing strip. The label material is then imprinted and the labels are die cut from the label material. Next, the selvage or excess label material is removed from the backing strip or web. A series of imprinted labels remains on the backing material. Application of the labels to a container is then effected by a machine or by manual means. A typical machine for such an operation is made by Kleen-Stik Products, Chicago, Illinois, and is sold under the trademark LABEL-AIRE.

While such labeling assemblies and mechanisms for applying labels have been quite successful in the past, there has been no special provision for promotional detachable portions of a label. For example, it is often desirable to provide premiums for customers. The labels often serve as premium redemption coupons. However, if the labels are easily removable from an item, they can be easily pilfered. Other means for attaching premiums such as by strings, tape and the like also have deficiencies and are subject to pilfering. The present invention contemplates a new, substantially pilferproof promotional label assembly.

SUMMARY OF THE INVENTION

In a principal aspect, the present invention comprises an improved label assembly including label backing material and at least one label having the print side out and an adhesive side against the label backing material. The backing material also includes a cut portion having a smaller area than the label and positioned, at least in part, against the label. The label and the cut portion of the backing material are attached to a product container. The label may be removed from the container to reveal the cut portion. The cut portion of the backing material may include printing thereon and may be used as a promotional item.

Thus, it is an object of the present invention to provide an improved label assembly.

It is a further object of the present invention to provide an improved method for manufacture of a label assembly.

Still another object of the present invention is to provide a label assembly including a label portion and a cut portion as part of the backing material for the label.

Another object of the present invention is to provide a label which is adhesively attached to a container and which includes a separable portion on the back side of the label which may serve as a promotional item or premium.

Still a further object of the present invention is to provide an improved label assembly which can be easily attached to containers by means of existing labeling equipment, yet which provides the added capability of including a promotional item as part of the label.

These and other objects, advantages and features of the invention will be set forth in the detailed description which follows.

BRIEF DESCRIPTION OF THE DRAWING

In the description which follows, reference will be made to the drawing comprised of the following figures.

DESCRIPTION OF THE PREFERRED EMBODIMENT

The label assembly of the present invention includes a strip of backing web or material 10 and label material 12. The backing material 10 supports the label prior to application to a container. The backing material 10 may be of a wax-coated paper or any other backing material known to those skilled in the art.

Figure 3:
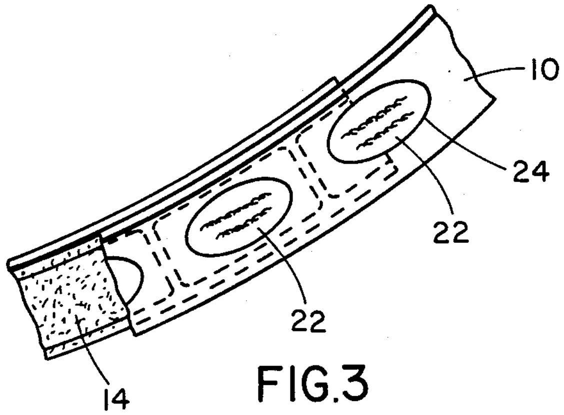
FIG. 3 is a perspective view of the back side of the label assembly shown in FIG. 2.

The label material 12 includes an adhesive backing 14 as illustrated in FIG. 3. The adhesive backing 14 is generally a pressure sensitive adhesive designed to permanently adhere to the underside or bottom side of the label material 12 while simultaneously being removably adhered to the backing material or web 10. The choice of adhesive material 14 is optional and may be varied subject to the requirements of the label maker. The combination of backing material 10 and label material 12 with various adhesives 14 is known to those skilled in the art.

Figure 1:
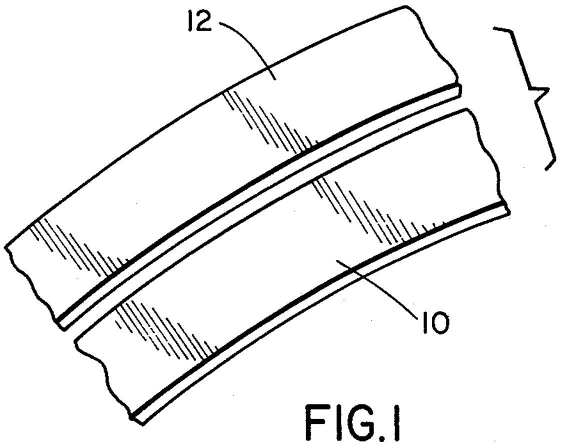
FIG. 1 is an exploded, perspective view illustrating a label material and a backing material.
Figure 2:
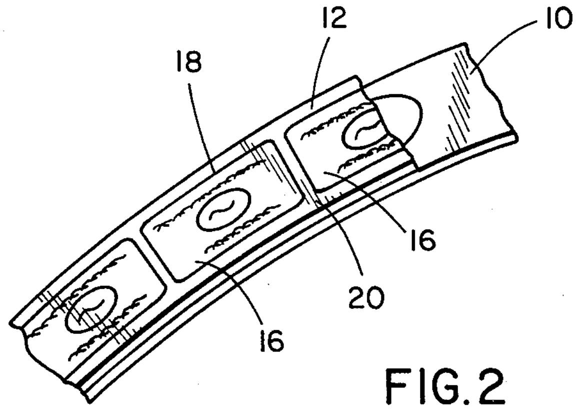
FIG. 2 is a perspective view of label material and backing material partially assembled in accordance with the disclosure of the present invention.

Labels 16 are formed and imprinted on the label material 12 as illustrated in FIG. 2. The labels 16 may be of any desired shape or design and may be also embossed. The labels 16 are generally die cut from the label material 12. Labels 16 are made from any label material known to those skilled in the art including paper, foil, plastic, cloth and the like. Thus, a cut line or edge 18 of label 16 is defined. Die cutting techniques and procedures of a label 16 on a web 10 are known to those skilled in the art. Note that the cut line 18 effectively defines and differentiates label 16 from selvage material 20.

Figure 4:
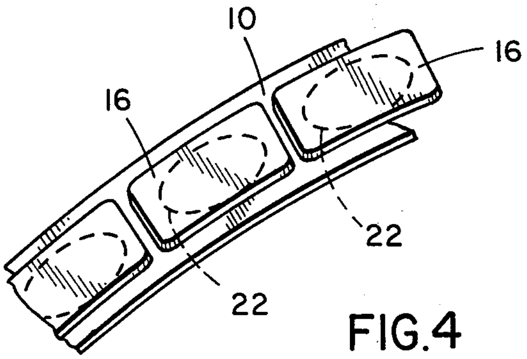
FIG. 4 is a perspective view of the finished label assembly of the present invention.

The assembly and method of the present invention provides that part of the backing material is also imprinted as illustrated in FIG. 3. Thus, a cut portion or back label 22 is defined. The backing material label 22 is cut from the backing material 10 along a closed edge or cut line 24. Generally, the back label 22 is opposed or against the label 16. The edge 18 of the label 16 extends beyond or overlays the edge 24 of label 22. This is illustrated in FIGS. 3–6. The final assembly is illustrated in FIG. 4.

The label assembly as shown in FIG. 4 thus includes a backing material or web 10. A series of labels 16 are attached to the web by means of adhesive material 14. The web 10 is also printed and cut to define back labels 22 over which front labels 16 are positioned. Back label 22 is preferably elliptical, though it may be circular, square or any desired shape.

Figure 5:
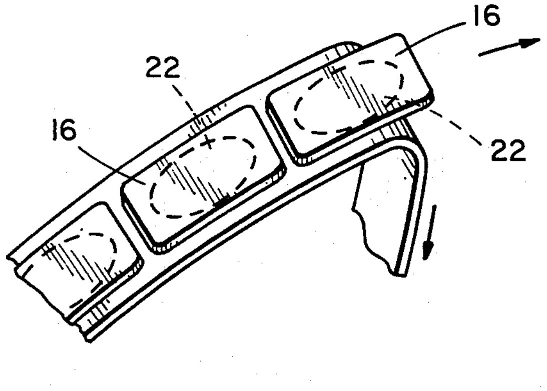
FIG. 5 is a perspective view of the manner in which the label assembly of the present invention is applied to a container.
Figure 6:
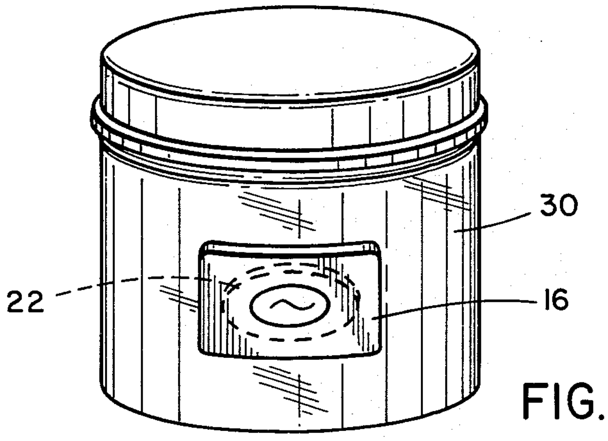
FIG. 6 is a plan view illustrating the application of a label construction to a container.

Upon removal of a label 16 from web 10, the cut portion or back label 22 remains in contact with label 16 as shown in FIG. 5. Thus, label 16 and opposed cut portion 22 may be affixed to a container 30 as shown in FIG. 6. Note that only part of the adhesive material 14 is effective to attach the label 16 to the container 30. Thus, adhesive material 14 about the entire outer periphery of cut portion 22 secures label 16 to container 30. Upon removal of the label 16 from the container 30, the cut portion 22 is also removed and exposed. Any printed message on that cut portion 22, such as shown in FIG. 3, is then revealed. The cut portion 22 may then be removed from label 16 and used as a premium which may be collected for various promotional purposes.

Figure 7:
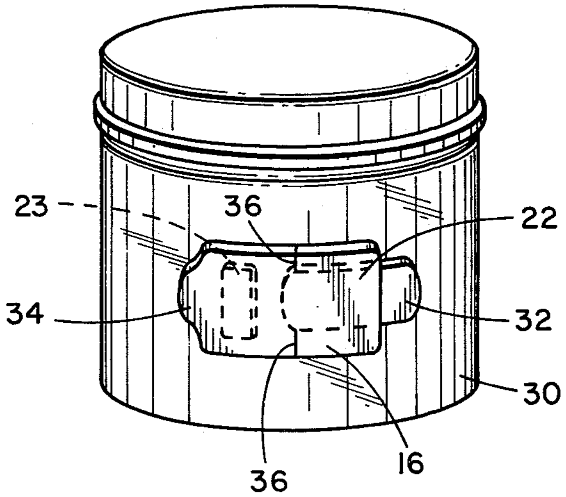
FIG. 7 is a plan view illustrating the application of an alternative label construction to a container.

Note that there are many alternative structures within the scope of the invention. For example, as shown in FIG. 7, a plurality of cut portions 22 and 23 may be positioned in association with a single label 16. Additionally, cut portion 22 may include a projecting section 32 which extends beyond the edge of the label 16. Label 16 may include a projectin tab 34 which facilitates manual grasping of the label and removal of the label from the container 30. Various patterns of slits 36 may be provided in the label 16 to also facilitate removal of the label 16 and access to the promotional back label 22.

In actual practice, the back label 22 is die cut thereby creating a slight emboss in the label 16 during the die cutting operation. Consequently, the design which is adopted for the label 16 may incorporate the die cut pattern associated with the cut portion 22. This will disguise the emboss resulting from the die cut for cut portion 22.

Another advantage of the present label construction becomes evident when the label is used in combination with glass bottles or other transparent packages. That is, the back or cut portion may contain a printed set of instructions viewable from the opposite side of the bottle. Such printing is of better visual quality when not covered by glue as in prior art labels.

Thus, while in the foregoing there has been set forth a preferred embodiment of the invention, it is to be understood that the invention shall be limited only by the following claims and their equivalents.

What is claimed is:

1. An improved label assembly comprising, in combination:

a. a plurality of separate labels, each of said labels having a print side and an adhesive side; and b. label backing material, said backing material including a plurality of cut portions, each of said cut portions having a smaller area than said separate labels, each of said cut portions having a side for printing, said backing material having said labels separated and mounted thereon with the adhesive side of each label being in generally opposed relation to one of said cut portions, said separate labels, backing strip and cut portions positioned so that said separate labels are carrried on said backing strip and when said labels are removed from said backing strip said cut portion is also removed from said backing material in opposed relation to said separate label.

2. The label assembly of claim 1 including printed matter on both the print side of the label and the cut portion of the label backing material.

3. The label assembly of claim 1 wherein said cut portion is elliptical.

4. The label assembly of claim 1 wherein the edges of said label extend peripherally beyond the edges of the cut portion whereby the label adheres to a surface and completely covers and surrounds the cut portion.

5. The label assembly of claim 1 wherein the cut portion includes a section projecting beyond the edge of the label whereby the label adheres to a surface and partially covers the cut portion.

6. The label assembly of claim 1 including a plurality of separate labels serially mounted on a single, continuous strip of flexible backing material.

7. The label assembly of claim 1 wherein said label is embossed.

8. The label assembly of claim 1 including a label projection for manual gripping.

9. The label assembly of claim 1 including means for facilitating removal of the label from a container.

10. A method of manufacture for a label assembly comprising, in combination:

a. adhering a label paper to a backing material, by temporary adhesive means whereby said adhesive is retained on the label and said backing material is removable;

b. imprinting labels on said label paper;

c. cutting the label paper to define a plurality of separate and separated labels of a final shape;

d. removing the portion of the label paper that does not define a separate label while retaining the backing paper; and e. imprinting and cutting a portion of the backing paper opposed to the label to define a separate cut portion coupon on the back side of each of the labels.

11. The method of claim 10 including the step of printing on the exposed surface of the backing material.

12. The method of claim 10 including the step of printing on the exposed surface of the cut portion.

13. The method of claim 10 including the step of stripping the non-label portions of the label paper from the backing material.

14. The method of claim 10 including cutting said portion of the backing paper to project part of said portion beyond the edge of the label.

* * * * *